(12) United States Patent
Ito

(10) Patent No.: US 8,335,273 B2
(45) Date of Patent: Dec. 18, 2012

(54) CONTROL APPARATUS FOR AND CONTROL METHOD OF EQUALIZER, AND WIRELESS TERMINAL HAVING THAT CONTROL APPARATUS

(75) Inventor: Akira Ito, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 529 days.

(21) Appl. No.: 12/564,398

(22) Filed: Sep. 22, 2009

(65) Prior Publication Data
US 2010/0008412 A1      Jan. 14, 2010

Related U.S. Application Data

(63) Continuation of application No. PCT/JP2007/057195, filed on Mar. 30, 2007.

(51) Int. Cl.
*H04B 7/02*         (2006.01)
(52) U.S. Cl. ........ 375/267; 375/343; 375/229; 375/150; 375/232; 455/450
(58) Field of Classification Search .................. 375/267
See application file for complete search history.

(56) References Cited

U.S. PATENT DOCUMENTS

| | | | |
|---|---|---|---|
| 5,646,964 A | 7/1997 | Ushirokawa et al. | |
| 7,280,835 B2 * | 10/2007 | Usuda et al. | 455/450 |
| 7,421,009 B2 | 9/2008 | Kawamoto et al. | |
| 2001/0043545 A1 * | 11/2001 | Aratani | 369/95 |
| 2005/0276360 A1 | 12/2005 | Fujii et al. | |
| 2008/0095279 A1 * | 4/2008 | Reial et al. | 375/343 |

FOREIGN PATENT DOCUMENTS

| | | |
|---|---|---|
| JP | 7-30519 | 1/1995 |
| JP | 2005-311470 | 11/2005 |
| JP | 2005-328311 | 11/2005 |
| JP | 2006-197350 | 7/2006 |

OTHER PUBLICATIONS

International Search Report dated Jul. 10, 2007, from the corresponding International Application.
Anja Klein "Data Detection Algorithms Specially Designed for the Downlink of CDMA Mobile Radio Systems" Proc. of IEEE VTC'97, pp. 203-207, 1997.
"HSDPA Improvements for UE categories 7 and 8" 3GPP R4-040680 TSG RAN WG4 meeting #33, Nov. 15-19, 2004.
"Reference Structure for Interference Mitigation Simulations with HSDPA and Receiver Diversity" 3GPP R4-060514 TSG RAN WG4 meeting #39, May 8-12, 2006.

* cited by examiner

*Primary Examiner* — Lihong Yu
(74) *Attorney, Agent, or Firm* — Katten Muchin Rosenman LLP

(57) ABSTRACT

For the first wireless base station, a first correlation value based on a calculation result on channel estimation values having an identical signal timing and a calculation result on channel estimation values having different signal timings, and determines, for the second wireless base station, a second correlation value based on a calculation result on channel estimation values having an identical signal timing, and controls the weighting-adding at the equalizer based on these correlation values.

11 Claims, 10 Drawing Sheets

FIG. 5

$$\begin{pmatrix}
S & 0 & \alpha_1^*\beta_1 & 0 & 0 & 0 & 0 & 0 & C & 0 & \alpha_1^*\beta_2 & 0 & 0 & 0 & 0 & 0 \\
0 & S & 0 & \alpha_1^*\beta_1 & 0 & 0 & 0 & 0 & 0 & C & 0 & \alpha_1^*\beta_2 & 0 & 0 & 0 & 0 \\
\beta_1^*\alpha_1 & 0 & S & 0 & \alpha_1^*\beta_1 & 0 & 0 & 0 & \beta_1^*\alpha_2 & 0 & C & 0 & \alpha_1^*\beta_2 & 0 & 0 & 0 \\
0 & \beta_1^*\alpha_1 & 0 & S & 0 & \alpha_1^*\beta_1 & 0 & 0 & 0 & \beta_1^*\alpha_2 & 0 & C & 0 & \alpha_1^*\beta_2 & 0 & 0 \\
0 & 0 & \beta_1^*\alpha_1 & 0 & S & 0 & \alpha_1^*\beta_1 & 0 & 0 & 0 & \beta_1^*\alpha_2 & 0 & C & 0 & \alpha_1^*\beta_2 & 0 \\
0 & 0 & 0 & \beta_1^*\alpha_1 & 0 & S & 0 & \alpha_1^*\beta_1 & 0 & 0 & 0 & \beta_1^*\alpha_2 & 0 & C & 0 & \alpha_1^*\beta_2 \\
0 & 0 & 0 & 0 & \beta_1^*\alpha_1 & 0 & S & 0 & 0 & 0 & 0 & 0 & \beta_1^*\alpha_2 & 0 & C & 0 \\
0 & 0 & 0 & 0 & 0 & \beta_1^*\alpha_1 & 0 & S & 0 & 0 & 0 & 0 & 0 & \beta_1^*\alpha_2 & 0 & C \\
C^* & 0 & \alpha_2^*\beta_1 & 0 & 0 & 0 & 0 & 0 & S & 0 & \alpha_2^*\beta_2 & 0 & 0 & 0 & 0 & 0 \\
0 & C^* & 0 & \alpha_2^*\beta_1 & 0 & 0 & 0 & 0 & 0 & S & 0 & \alpha_2^*\beta_2 & 0 & 0 & 0 & 0 \\
\beta_2^*\alpha_1 & 0 & C^* & 0 & \alpha_2^*\beta_1 & 0 & 0 & 0 & \beta_2^*\alpha_2 & 0 & S & 0 & \alpha_2^*\beta_2 & 0 & 0 & 0 \\
0 & \beta_2^*\alpha_1 & 0 & C^* & 0 & \alpha_2^*\beta_1 & 0 & 0 & 0 & \beta_2^*\alpha_2 & 0 & S & 0 & \alpha_2^*\beta_2 & 0 & 0 \\
0 & 0 & \beta_2^*\alpha_1 & 0 & C^* & 0 & \alpha_2^*\beta_1 & 0 & 0 & 0 & \beta_2^*\alpha_2 & 0 & S & 0 & \alpha_2^*\beta_2 & 0 \\
0 & 0 & 0 & \beta_2^*\alpha_1 & 0 & C^* & 0 & \alpha_2^*\beta_1 & 0 & 0 & 0 & \beta_2^*\alpha_2 & 0 & S & 0 & \alpha_2^*\beta_2 \\
0 & 0 & 0 & 0 & \beta_2^*\alpha_1 & 0 & C^* & 0 & 0 & 0 & 0 & 0 & \beta_2^*\alpha_2 & 0 & S & 0 \\
0 & 0 & 0 & 0 & 0 & \beta_2^*\alpha_1 & 0 & C^* & 0 & 0 & 0 & 0 & 0 & \beta_2^*\alpha_2 & 0 & S
\end{pmatrix}$$

$C = \alpha_1^*\alpha_2 + \beta_1^*\beta_2$ $S = |\alpha_1|^2 + |\alpha_2|^2 + |\beta_1|^2 + |\beta_2|^2$

FIG. 6

$$C_1 = \gamma_1^* \gamma_2 + \delta_1^* \delta_2$$
$$S_1 = |\gamma_1|^2 + |\gamma_2|^2 + |\delta_1|^2 + |\delta_2|^2$$

CONTROL APPARATUS FOR AND CONTROL METHOD OF EQUALIZER, AND WIRELESS TERMINAL HAVING THAT CONTROL APPARATUS

CROSS-REFERENCE TO RELATED APPLICATION

This application is a continuation Application of a PCT international application No. PCT/JP2007/057195 filed on Mar. 30, 2007 in Japan, the entire contents of which are incorporated by reference.

FIELD

The embodiments discussed herein are related to a control apparatus for and a control method of an equalizer, and a wireless terminal having such a control apparatus.

BACKGROUND

In wireless communication technologies, such as cellular systems, equalizers are used as a technique for reducing multipath interferences. Equalizers are a technique for reducing interferences by calculating an appropriate synthesis (weighting) coefficient from estimation results of a propagation path (channel), and weighting-adding reception signals using the synthesis coefficient, thereby equalizing reception signals.

Here, for example, a signal y(t) after an equalizer at time t can be expressed using a reception signal x(t) and a synthesis coefficient (tap coefficient) w(i) according to the following Eq. (1.1):

$$y(t) = \sum_i w(i) \cdot x(t - i) \qquad (1.1)$$

How the synthesis coefficient w(t) is calculated determines characteristics of the equalizer and the processing amount.

Conventional equalizers either calculate the synthesis coefficient w based on the correlation matrix $R_0$ only of the serving cell as expressed by the following Eq. (1.2) (see Non-Patent References 1 and 2 that will be listed later, for example), or calculate the tap coefficient by determining a synthesis correlation matrix by a sum of the correlation matrix $R_0$ of the serving cell and correlation matrixes $R_i$ of non-serving cells (base station number #i) as expressed by the following Eq. (1.3) (see Non-Patent Reference 3 that will be listed later, for example).

$$w = (R_0 + \sigma^2 I)^{-1} \cdot h \qquad (1.2)$$

$$w = \left(R_0 + \sum_i R_i + \sigma^2 I\right)^{-1} \cdot h \qquad (1.3)$$

In the above Eqs. (1.2) and (1.3), I represents the unit matrix, and $\sigma^2$ represents the noise. In addition, a correlation matrix R can be calculated by the following Eq. (1.4) using the channel estimation value $\alpha(r, k)$ of the reception antenna number #r and the path number #k:

$$R_{(r1,k1),(r2,k2)} = \sum_i \alpha(r1, i + k1)^* \cdot \alpha(r2, i + k2) \qquad (1.4)$$

Note that the term "correlation matrix $R_0$ of the serving cell" refers to a matrix having, as an element, a correlation value based on a channel estimation value of an incoming signal (path) from a base station (serving cell) with which a wireless communication apparatus having an equalizer is communicating. The term "correlation matrix of a non-serving cell $R_i$," refers to a matrix having, as an element, a correlation value based on a channel estimation value of an incoming signal (path) from a base station (interference station) other than that serving cell (the definitions of the terms will be used throughout the specification).

Note that well-known techniques regarding equalizers include the techniques described in the Patent References 1 and 2 listed below.

The technique in Patent Reference 1 is directed to provide a CDMA reception apparatus that experiences reduced deterioration of the receiver performance even when the number of concurrent users is increased in the DS/CDMA scheme during fast fading or in a multipath environment, and thus multiple interference elimination equalizers are provided for this purpose. Those interference elimination equalizer are adapted to regard multipath signal components at timings other than specified timing as signals from non-serving cells and eliminates such components, and to syntheses a multipath signal component only at the designated timing.

The technique in Patent Reference 2 is directed to provide a noise power estimation apparatus that can estimate a chip noise power used for a weight calculation for an MMSE equalizer or the like. For this purpose, the apparatus is adapted to determine the noise power by eliminating multipath interference components from the reception power of the pilot signal for each path using the power ratio of pilot signal to data signal for each path, determining a modified reception power of the pilot signal for each path, estimating the total power of the pilot signal and the data signal included in the reception signal based on the modified reception power for the multiple paths and the predetermined power ratio, and subtracting the estimated total power from the total power of the reception signal.

Patent Reference 1: Japanese Laid-Open Patent 1 Publication No. H07-30519

Patent Reference 2: Japanese Laid-Open Patent Publication No. 2005-328311

Non-Patent Reference 1: A. Klein, "Data Detection Algorithms Specially Designed for the Downlink of Mobile Radio Systems", Proc. of IEEE VTC'97, PP. 203-207, Phoenix, May 1997

Non-Patent Reference 2: 3GPP R4-040680, "HSDPA improvements for UE categories 7 and 8", Nokia, TSG RAN WG4#33, November 2004

Non-Patent Reference 3: 3GPP R4-060514, "Reference structure for interference mitigation simulations with HSDPA and receiver diversity", Nokia, TSG RAN WG#39, May 2006

However, in the case of determining the synthesis coefficient w based solely on the correlation matrix $R_0$ of the serving cell (hereinafter, referred to as a Conventional Example 1), although the processing amount can be reduced, the receiver performance may be deteriorated since the interference components from non-serving cells cannot be reduced. On the other hand, in the case of determining the synthesis coefficient based on the correlation matrix $R_0$ of the serving cell and correlation matrixes $R_i$ of non-serving cells (hereinafter, referred to as a Conventional Example 2), the processing (calculation) amount is increased although the receiver performance is improved. That is, the calculation amount of twofold or higher is required compared to the case based solely on the correlation matrix $R_0$ of the serving cell since a correlation matrixes R should be calculated for the serving cell and each of the non-serving cells.

In addition, since the technique in Patent Reference 1 inadvertently may eliminate multipath signal components at timings other than the specified timing since such components are mistaken as signals from non-serving cell and multipath signal components of the serving cell are accidentally eliminated, or conversely, multipath signal components of non-serving cells may be erroneously included into multipath signal components of the serving cell, which may deteriorate the receiver performance.

In addition, since the technique in Patent Reference 2 is a technique in which the noise power from the serving cell is measured highly accurately without taking multipath signal components from non-serving cells into consideration, the receiver performance may be degraded due to interferences from non-serving cells.

SUMMARY (1) According to an aspect of the embodiments, an apparatus includes a control apparatus for an equalizer that equalizes a reception signal by controlling a weighting-adding on a received sequence based on a correlation between a signal sent from a first wireless base station and an interference signal from a second wireless base station to the signal, the control apparatus including:

(a) channel estimation unit that determines a channel estimation value regarding the first wireless base station based on a signal from the first wireless base station and determines a channel estimation value regarding the second wireless base station based on a signal from the second wireless base station;

(b) correlation value calculation unit that determines, for the first wireless base station, a first correlation value based on a calculation result on channel estimation values having an identical signal timing and a calculation result on channel estimation values having different signal timings, and determines, for the second wireless base station, a second correlation value based on a calculation result on channel estimation values having an identical signal timing; and (c) weighting control unit that controls the weighting-adding at the equalizer based on the first and second correlation values determined by the correlation value calculation unit.

(2) According to an aspect of the embodiments, an apparatus includes a wireless terminal including any one of the control apparatuses for the equalizer.

(3) According to an aspect of the embodiments, a method includes a control method of an equalizer that equalizes a reception signal by controlling a weighting-adding on a received sequence based on a correlation between a signal sent from a first wireless base station and an interference signal from a second wireless base station to the signal, the method including:

(a) a channel estimation step that determines a channel estimation value regarding the first wireless base station based on a signal from the first wireless base station and determines a channel estimation value regarding the second wireless base station based on a signal from the second wireless base station;

(b) a correlation value calculation step that determines, for the first wireless base station, a first correlation value based on a calculation result on channel estimation values having an identical signal timing and a calculation result on channel estimation values having different signal timings, and determines, for the second wireless base station, a second correlation value based on a calculation result on channel estimation values having an identical signal timing; and (c) a weighting control step that controls the weighting-adding at the equalizer based on the first and second correlation values determined at the correlation value calculation step.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 5 is a diagram illustrating one example of an correlation matrix determined by the serving cell correlation matrix calculation block depicted in FIG. 3 in the reception environment depicted in FIG. 4;

FIG. 6 is a diagram illustrating one example of an correlation matrix determined by the non-serving cell correlation matrix calculation block depicted in FIG. 3 in the reception environment depicted in FIG. 4;

DESCRIPTION OF EMBODIMENTS

Hereinafter, embodiments will be described with reference to the drawings. Note that the embodiments described below are described by way of example only for ease of understanding of the concept of the embodiments, and various modifications and technical applications that are not provided explicitly in the following embodiments are not intended to be excluded. In other words, any modifications and applications of techniques to the embodiments are within the spirit of the embodiments and are apparent to those ordinally skilled in the art (skilled artisans), and are naturally within the scope technological scope of the embodiments.

(A) Description of One Embodiment

Figure 1:
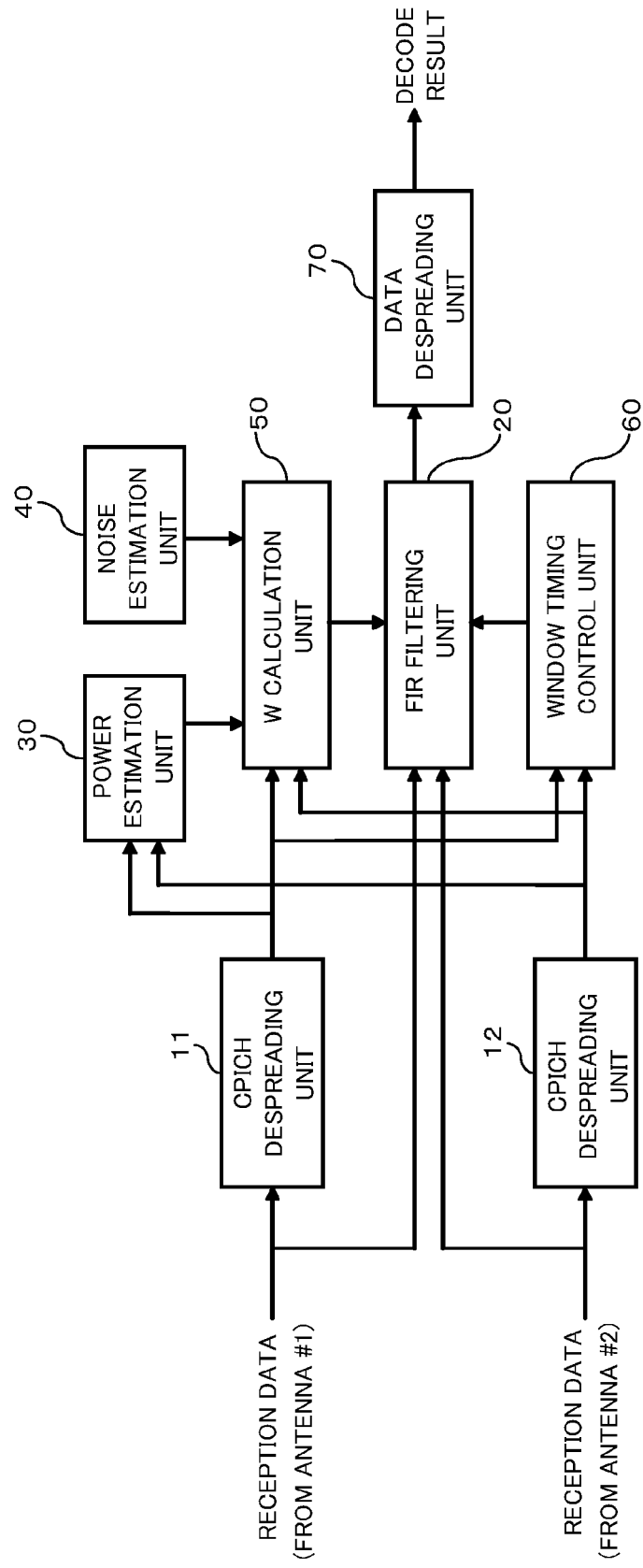
FIG. 1 is a block diagram illustrating a configuration of the main portion of a wireless receiver according to one embodiment.
Figure 2:
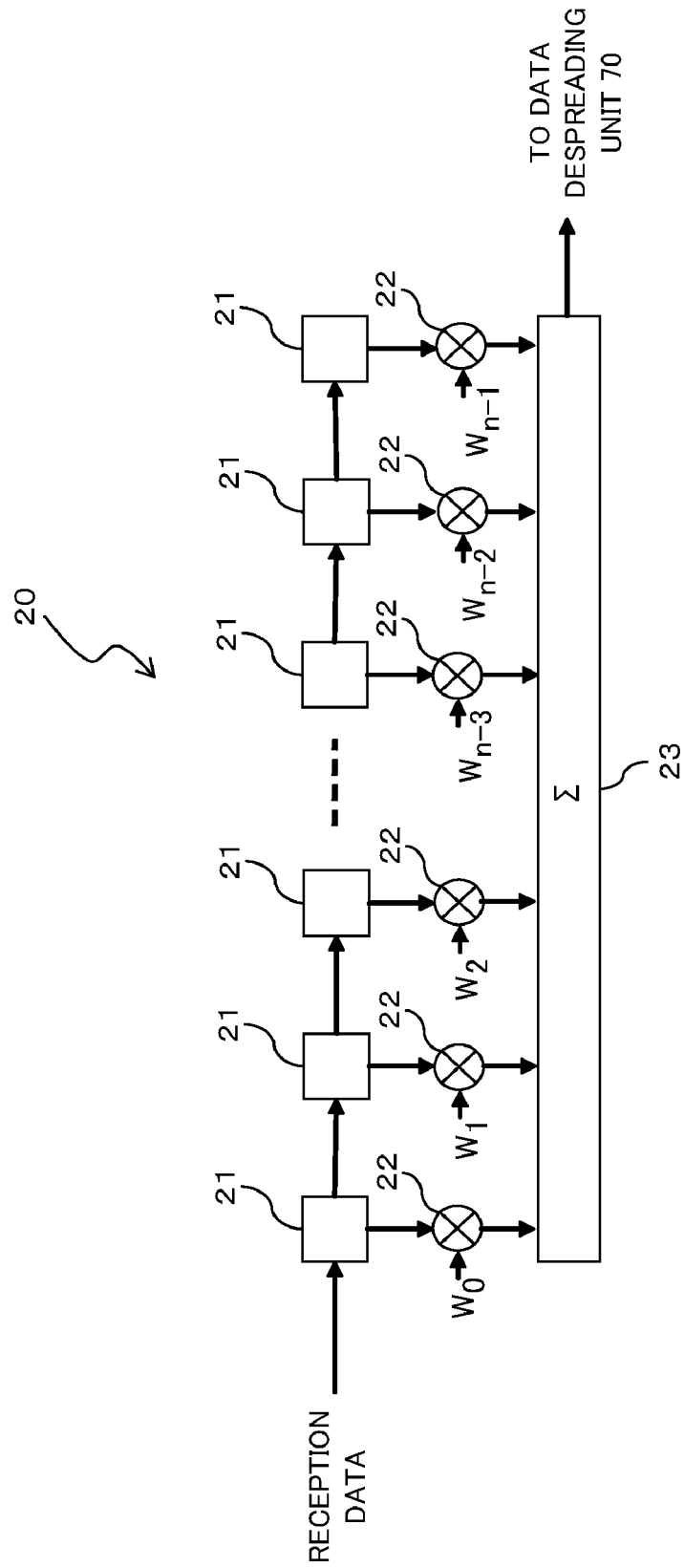
FIG. 2 is a block diagram illustrating a configuration of an FIR filter unit depicted in FIG. 1.

FIG. 1 is a block diagram illustrating the main portion of a wireless reception apparatus according to one embodiment. The wireless reception apparatus depicted in FIG. 1 can be employed as a reception system of a wireless terminal (MS), such as a wireless telephone, for example, and is configured to include two antennas #1 and #2, common pilot channel (CPICH) despreading units 11 and 12 for the antennas #1 and #2, respectively, an equalizer (FIR filtering unit) 20, a power estimation unit 30, a noise estimation unit 40, a weight (W) calculation unit 50, a window timing control unit 60, and a data despreading unit 70. Note that the control apparatus of the equalizer 20 comprises the power estimation unit 30, the noise estimation unit 40, the weight (W) calculation unit 50, and the window timing control unit 60, for example.

Here, the CPICH despreading unit (channel estimation unit) 11 is adapted to determine channel estimation values of each of common pilot signals from the serving cell (first wireless base station) and a non-serving cell (second wireless base station) by despreading signals received at one antenna #1 using a code of the serving cell (transmission station that is a serving cell) and a code of the non-serving cell (interference station, the station that sends signals that interfere with reception signals from the serving cell). The CPICH despreading unit (channel estimation unit) 12 is adapted to determine channel estimation values of each of common pilot signals from the serving cell and the non-serving cell by similarly despreading signals received at the other antenna #2 using the code of the serving cell and the code of the non-serving cell.

The FIR filtering unit 20 is adapted to equalize the above reception data (FIR filtering) for the purpose of reducing multipath interferences, and is configured to include n delay circuits 21 (n is an integer equal to or greater than 2) that delay input reception data by a unit time (one chip), and n tap multipliers 22 that multiply the outputs from the delay circuits 21 by tap coefficients $w_0, w_1, \ldots, w_{n-1}$, and an addition circuit ($\Sigma$) 23 that adds the outputs from the tap multipliers 22 (determines the total sum).

The window timing control unit 60 is adapted to control the number of tap coefficients w (the window timings for determining the window width) for the filtering at the FIR filtering unit 20 based on the despreading results from each of the CPICH despreading units 11 and 12. The data despreading unit 50 is adapted to despread the output of the FIR filtering unit 20 to obtain the demodulation result.

The power estimation unit 30 is adapted to estimate the reception power based on the despreading results from each of the CPICH despreading units 11 and 12. The noise estimation unit 40 is adapted to determine the noise estimation value ($\rho^2 I$). Note that the power estimation unit 30 has a function that is required for variants that will be described later, and thus may be omitted in this embodiment.

The weight calculation unit (correlation value calculation unit, weighting control unit) 50 is adapted to determine each correlation matrix for the serving cell and the non-serving cell based on the estimation values from the estimation units 30 and 40 and the despreading results (the channel estimation values between the serving cell and the non-serving cell) from the CPICH despreading units 11 and 12, and determine the tap coefficients w for each tap multiplier 22 in the FIR filtering unit 20 from these correlation matrixes. In this example, the calculation amount can be reduced using a simplified matrix Q in which correlation values are calculated only for signals incoming to the antennas #1 and #2 at the same timing and remaining components are set to zero, rather than determining the correlation matrix of the non-serving cell using a calculation similar to the calculation used for determining the correlation matrix $R_0$ of the serving cell.

That is, the weight calculation unit 50 in this example is adapted to determine the correlation matrix (first correlation value) $R_0$ for the serving cell and the correlation matrix (second correlation value) Q for the non-serving cell according to the calculations expressed by the following Eqs. (2.2) and (2.3), and determine the tap coefficient w from these synthesis matrixes R using the following Eq. (2.1). Note that it is assumed that the matrixes $R_0$, Q, and R are all matrix having i rows and j columns, and that the channel estimation value of the antenna number #r (r1, r2) and the path number #m is expressed as Y(r, m).

$$w = R^{-1} \cdot h \quad (2.1)$$

$$R = R_0 + \sum_m Q_m + \sigma^2 I \quad (2.2)$$

$$Q_m = \sum_m Y(r1, m+i)^* \cdot Y(r2, m+j) \cdot \delta(m+i, m+j) \quad (2.3)$$

where $\delta$ (x, y) represents a Kronecker delta, which is 1 when x=y or 0 when x≠y in Eq. (2.3).

Figure 4:
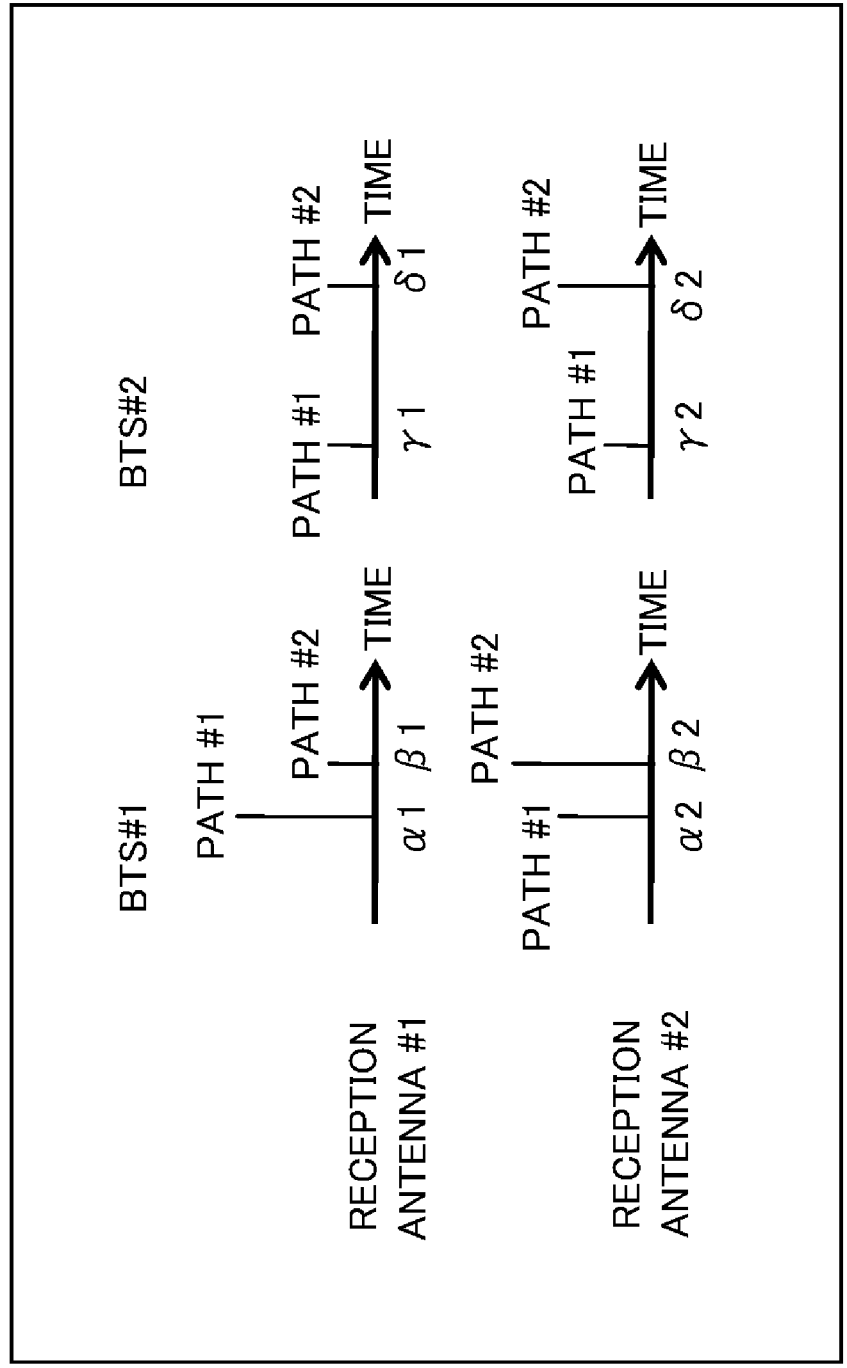
FIG. 4 is a drawing schematically illustrating an example of the reception environment (multipath signals incoming to the reception antenna) of the wireless reception apparatus depicted in FIGS. 1-3.

For example, as depicted in FIG. 4, assume the case in which, in the reception environment in which signals arrive at the antenna #1 and #2 from the wireless base station (BTS) #1 through two paths #1 and #2, respectively, and signals also arrive at the antenna #1 and #2 from the BTS #2 through two paths #1 and #2, respectively, only the signals from the BTS #1 are received as effective signals (the signals from the BTS #2 are interference waves).

For this example, the correlation matrix $R_0$ for the BTS #1 (serving cell) is illustrated in FIG. 5, and the correlation matrix Q for the BTS #2 (non-serving cell) is illustrated in FIG. 6. The tap coefficient w is determined based on the matrix depicted in FIG. 5 in Conventional Example 1 while the tap coefficient w is determined by calculating matrixes depicted in FIG. 5 for each of the BTSs #1 and #2 in Conventional Example 2 so as to improve the receiver performance. In this example, the receiver performance is improved while reducing the calculation amount by determining the simplified matrix Q depicted in FIG. 6 as a correlation matrix for the BTS #2.

Figure 3:
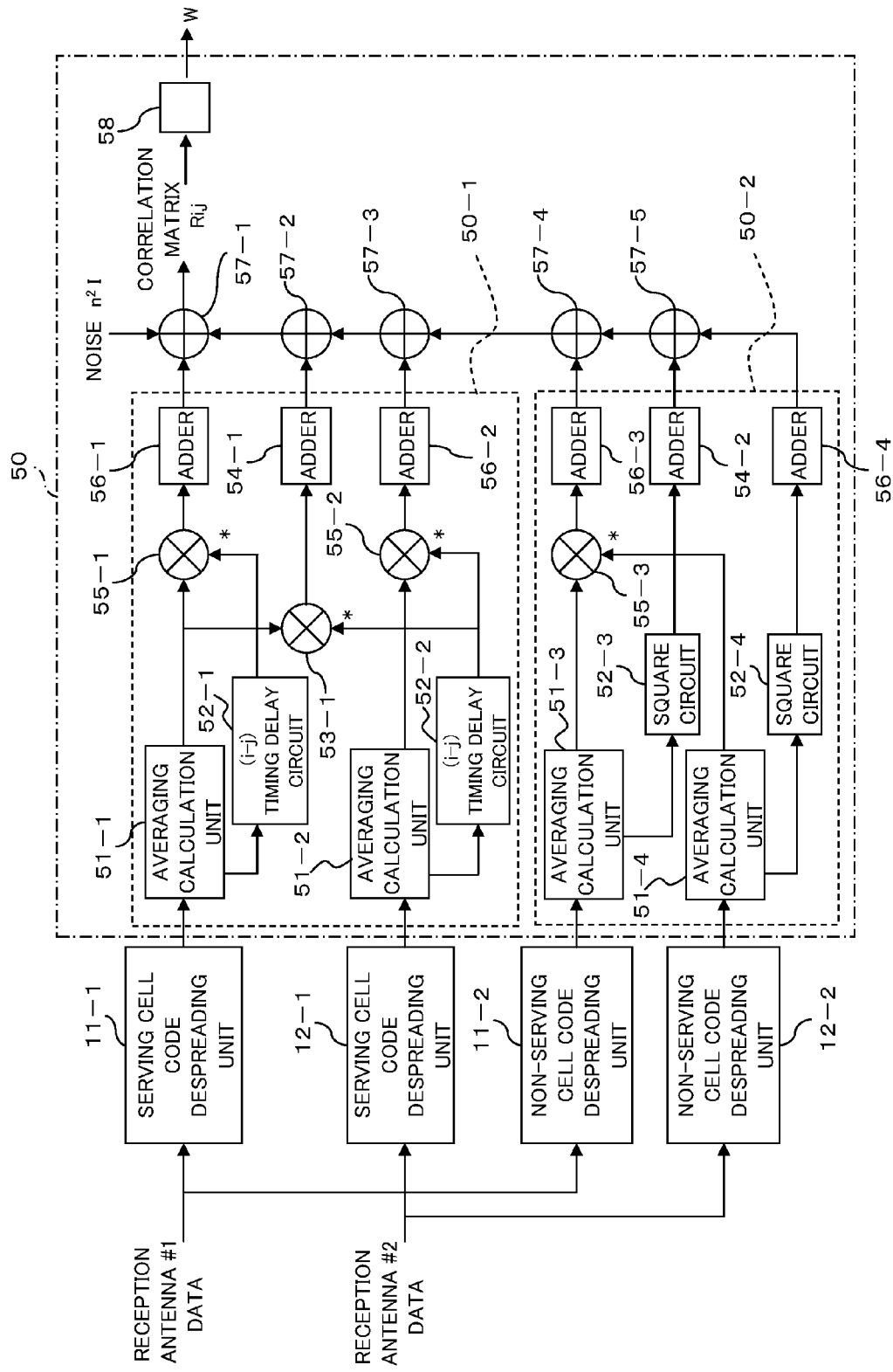
FIG. 3 is a block diagram illustrating a pilot channel (CPICH) despreading unit and a weight calculation unit depicted in FIG. 1.

For this purpose, the wireless reception apparatus in this example is configured to include a serving cell code despreading unit 11-1 and a non-serving cell code despreading unit 11-2 as the above-described CPICH despreading unit 11, as well as including a serving cell code despreading unit 12-1 and a non-serving cell code despreading unit 12-2 as the above-described CPICH despreading unit 12, as depicted in FIG. 3, for example.

In addition, the weight calculation unit 50 is configured to include common pilot despreading units 51-1 to 51-4, averaging calculation units 51-1 to 51-4, timing delay circuits 52-1 and 52-2, square circuits 52-3 and 52-4, complex multipliers 53-1 and 55-1 to 55-3, adders 54-1, 54-2, 56-1 to 56-4, and 57-1 to 57-5, and a matrix calculation unit 58, as depicted in FIG. 3, for example.

The block illustrated in the dotted line rectangle 50-1, that is, the block having the averaging calculation units 51-1 and 51-2, the timing delay circuits 52-1 and 52-2, the complex multipliers 53-1, 55-1, and 55-2, the adders 54-1, 56-1, 56-2, and 57-1 to 57-3 functions as a serving cell correlation matrix calculation block (first wireless base station correlation value calculation unit) that determines the correlation matrix $R_0$ for the serving cell (BTS #1). The block illustrated in dotted line rectangle 50-2, that is, the block having the averaging calculation units 51-3 and 51-4, the square circuits 52-3 and 52-4, the complex multiplier 55-3, the adder 56-3, 54-2, 56-4, 57-4, and 57-5 functions as a non-serving cell correlation matrix calculation block (second wireless base station correlation value calculation unit) that determine the correlation matrix Q for the non-serving cell (BTS #2).

Here, the serving cell code despreading unit (first wireless base station channel estimation) 11-1 is adapted to determine the channel estimation value between one reception antenna #1 and the BTS #1 by despreading reception data (common pilot signal) for the reception antenna #1 using the code of the serving cell (BTS #1). The non-serving cell code despreading unit (second wireless base station channel estimation) 11-2 is adapted to determine the channel estimation value between the reception antenna #1 and the BTS #2 by despreading the reception data (common pilot signal) for the reception antenna #1 using the code of the non-serving cell (BTS #2).

Here, the serving cell code despreading unit (first wireless base station channel estimation) 12-1 is adapted to determine the channel estimation value between the other reception antenna #2 and the BTS #1 by despreading the reception data (common pilot signal) for the reception antenna #2 using the code of the serving cell. The non-serving cell code despreading unit (second wireless base station channel estimation) 12-2 is adapted to determine the channel estimation value between that reception antenna #2 and the BTS #2 by despreading the reception data (common pilot signal) for the reception antenna #2 using the code of the non-serving cell.

Furthermore, in the weight calculation unit 50, the averaging calculation units 51-1 and 51-2 are adapted to average the despreading results (the channel estimation value with the BTS #1) from corresponding despreading units 11-1 and 12-1, respectively. The timing delay circuits 52-1 and 52-2 are adapted to delay the average values of the channel estimation values obtained at the averaging calculation units 51-1 and 51-2 (average channel estimation values) by (i-j) (when assuming that the correlation matrix $R_0$ for the serving cell is a matrix having i rows and j columns) and output delayed values to the complex multipliers 55-1 and 55-2, respectively.

The complex multiplier 55-1 is adapted to complex-multiply the output from the timing delay circuit 52-1 by the outputs from the averaging calculation units 51-1 and 51-2. This complex multiplication corresponds to, when taking the reception status depicted in FIG. 4 as an example, determining the 7×7 block element (correlation values S, 0, $\alpha_1^*\beta_1$, and $\beta_1^*\alpha_1$) of the upper left (the antenna #1—the antenna #1) of the matrix $R_0$ depicted in FIG. 5 by multiplying one of the channel estimation value $\alpha_1$ and $\beta_1$ of the paths #1 and #2 that reach at one antenna #1 as a conjugate complex number with the timing deviated by (i-j) with the other of $\alpha_1$ and $\beta_1$.

Similarly, the complex multiplier 55-2 is adapted to complex-multiply the output from the timing delay circuit 52-2 by the outputs from the averaging calculation units 51-2 and 51-2. This complex multiplication corresponds to, when taking the reception status depicted in FIG. 4 as an example, determining the 7×7 block element (correlation values S, 0, $\alpha_2^*\beta_2$, and $\beta_2^*\alpha_2$) of the lower right (the antenna #2—the antenna #2) of the matrix $R_0$ depicted in FIG. 5 by multiplying one of the channel estimation value $\alpha_2$ and $\beta_2$ of the paths #1 and #2 that reach at the other antenna #2 with the timing deviated by (i-j) as a conjugate complex number with the other of $\alpha_2$ and $\beta_2$.

Note that $S=|\alpha_1|^2+|\alpha_2|^2+|\beta_1|^2+|\beta_2|^2$ and, among the addition elements, the elements of $|\alpha_1|^2$ and $|\beta_1|^2$ are obtained as a calculation result from one complex multiplier 55-1 when i=j, and the elements of $|\alpha_2|^2$ and $|\beta_2|^2$ are obtained as a calculation result of the other complex multiplier 55-2 when i=j. That is, each addition component of the above S is obtained as the complex multiplication result between the channel estimation values when signals from the different paths #1 and #2 reach at the same antenna #1 or #2 at the same timing.

The complex multiplier 53-1 is adapted to complex-multiply the outputs from the averaging calculation units 51-1 by the output from the timing delay circuit 52-2. This complex multiplication corresponds to, when taking the reception status depicted in FIG. 4 as an example, determining 7×7 block elements (correlation values C*, 0, $\alpha_2^*\beta_1$, $\beta_2^*\alpha_1$, $\alpha_1^*\beta_2$, and $\beta_1^*\alpha_2$) of the lower left and the upper right (the antenna #1—the antenna #2 and the antenna #2—the antenna #1) of the matrix $R_0$ depicted in FIG. 5 by multiplying one of the channel estimation value $\alpha_1$ and $\beta_2$ of the paths #1 and #2 that reach at each of the antennas #1 and #2 with the timing deviated by (i-j) and the channel estimation value $\alpha_2$ and $\beta_1$ with the other as a conjugate complex numbers, respectively. Note that $C^*=\alpha_1^*\alpha_2+\beta_1^*\beta_2$, and $\alpha_1^*\alpha_2$ and $\beta_1^*\beta_2$ are the calculation results from the complex multiplier 53-1 when i=j, that is, they are obtained as the complex multiplication results between the channel estimation values when signals from the same path #1 or #2 reach at the different antennas #1 and #2 at the same timing.

The adder 56-1 is adapted to determine the 7×7 block on the upper left of the matrix $R_0$ depicted in FIG. 5 by cumulatively adding outputs from the complex multiplier 55-1. Similarly, the adder 56-2 is adapted to determine the 7×7 block on the lower right of the matrix $R_0$ depicted in FIG. 5 by cumulatively adding outputs from the complex multiplier 55-2. The adder 54-1 is adapted to determine the 7×7 blocks on the lower left and upper right of the matrix $R_0$ depicted in FIG. 5 by cumulatively adding outputs from the complex multiplier 53-1.

The adders 57-1, 57-2, and 57-3 are adapted to determine the correlation matrix $R_0$ depicted in FIG. 5 for the serving cell (BTS #1) by adding (synthesizing) the addition results (block elements) from the respective adders 56-1, 54-1, and 56-2, respectively.

On the other hand, the averaging calculation units 51-3 and 51-4 are adapted to average the despreading results (the channel estimation values with the BTS #2) from corresponding despreading units 11-2 and 12-2, respectively. The square circuits 52-3 and 52-4 are adapted to square the outputs from the corresponding averaging calculation units 51-3 and 51-4, respectively. The squares corresponds to, when taking the reception status depicted in FIG. 4 as an example, determining the 7×7 block elements (diagonal elements) $S_1$ on the upper left and lower right (the antenna #1—the antenna #1 and the antenna #2—the antenna #2) of the matrix Q depicted in FIG. 6 by complex-multiply channel estimation values when signals from the different paths #1 and #2 reach at the same antenna #1 or #2 at same timing (when i=j). Note that $S_1=|Y_1|^2+|Y_2|^2+|\delta_1|^2+|\delta_2|^2$, and, among the addition elements, the elements of $|Y_1|^2$ and $|\delta_1|^2$ are obtained as the calculation result from the square circuit 52-3, and the elements of $|Y_2|^2$ and $|\delta_2|^2$ are obtained as the calculation result from the square circuit 52-4.

The complex multiplier 55-3 is adapted to complex-multiply the output of each of the above-described averaging calculation units 51-3 and 51-4. This complex multiplication corresponds to, when taking the reception status depicted in FIG. 4 as an example, determining the addition components $Y_1^*Y_2$ and $\delta_1^*\delta_2$ of each of 7×7 block elements (diagonal elements) $C_1$ and $C_1^*$ ($C_1=Y_1^*Y_2+\delta_1^*\delta_2$) on the lower left and upper right (the antenna #1—the antenna #2, the antenna #2—the antenna #1) of the matrix Q depicted in FIG. 5 by multiplying one of the channel estimation values from the same path #1 or #2 reaching at the different antennas #1 and #2 at same timing (when i=j) as a conjugate complex number with the other channel estimation value.

In addition, the adder 56-3 is adapted to determine each of the upper left and lower right blocks of the matrix Q depicted in FIG. 6 by cumulatively adding outputs from the complex multiplier 55-3. The square circuits 52-3 and 52-4 are adapted to determine each of lower left and upper right blocks of the matrix Q depicted in FIG. 6 by cumulatively adding respective outputs from the adder 54-2 and 56-4, respectively.

In addition, the adders 57-4 and 57-5 are adapted to determine the matrix Q for the non-serving cell (BTS #2) depicted in FIG. 6 expressed by Eq. (2.3) described above by adding the addition results (block elements) from the adders 56-3, 54-2, and 56-4, wherein the synthesis matrix R expressed by Eq. (2.2) described above is determined by adding (synthesizing) the matrix Q with the matrix $R_0$ and the noise estimation value $\rho^2 I$ through the adders 57-1 to 57-3.

Finally, the matrix calculation unit 58 is adapted to determine the tap coefficient w by resolving the above-described Eq. (2.3) based on the synthesis matrix R and the channel estimation value h obtained as outputs of the serving cell code despreading units 11-1 and 12-1 described above, and to provide the tap coefficient w to the tap multiplier 22 of the FIR filtering unit 20.

Hereinafter, the operation (tap coefficient calculation method) of the wireless reception apparatus that is configured as described above according to this embodiment will be described when assuming the reception environment depicted in FIG. 4. Signals at the BTSs #1 and #2 arrive at the reception antennas #1 and #2, respectively, and the channel estimation values for the BTSs #1 and #2 are obtained by despreading each of the reception signals at the antennas #1 and #2 by means of the CPICH despreading unit 11 (the serving cell code despreading unit 11-1, the common pilot despreading unit 51-2), the CPICH despreading unit 12 (the serving cell code despreading unit 12-1, the common pilot despreading unit 52-2) using the spreading codes for the common pilot signals of the BTSs #1 and #2 (channel estimation step).

The weight calculation unit 50 is adapted to determine the correlation matrixes R (the matrixes $R_0$ and Q) using the thus obtained channel estimation values to determine the tap coefficient w.

More specifically, for the channel estimation values determined by the serving cell code despreading units 11-1 and 12-1 for each of the antennas #1 and #2, and at the above-described timing delay circuits 52-1 and 52-2, the complex multipliers 53-1, 55-1, and 55-2, the adders 54-1, 56-1, 56-2, and 57-1 to 57-3, the correlation matrix $R_0$ for the serving cell is determined by multiplying one of the channel estimation values having the timing difference (i-j) as a conjugate complex number with the other channel estimation value and executing this operation for all timings (identical and different signal timings) at which the channel estimation values are determined as described above ((serving cell) correlation value calculation step).

That is, assuming that the channel estimation value is X(r, m) for the antenna number #r (r1, r2), and path number #m, the correlation matrix $R_{i,j} = R_0$ having i rows and j columns is calculated by the following Eq. (2.4) as depicted in FIG. 5. Note that in the case of the reception environment depicted in FIG. 4, the values corresponds to $X(1, 1) = \alpha_1$, $X(1, 2) = \beta_1$, $X(2, 1) = \alpha_2$, and $X(2, 2) = \beta_2$.

$$R_0 = \sum_m X(r1, m+i)^* \cdot X(r2, m+j) \quad (2.4)$$

On the other hand, for the channel estimation valued determined by the common pilot despreading units 51-2 and 12-2 for each antenna #1 or #2, in order to reduce the calculation amount, channel estimation values without timing difference (at the identical signal timing) are multiplied at the averaging calculation units 51-3 and 51-4, the square circuits 52-3 and 52-4, the complex multiplier 55-3, the adder 54-2, 56-3, 56-4, 57-4, and 57-5 as described above (for the same antenna #1 or #2, a square sum is taken at the square circuits 52-3 and 52-4). That is, for an antenna number #r, the matrix Q for the non-serving cell is calculate according to the following Eq. (2.5) using the channel estimation value Y(r, k) for the path number #k ((non-serving cell) correlation value calculation step).

$$Q_{i,j} = \sum_m Y(r1, m)^* \cdot Y(r2, m) \quad (2.5)$$

Then, the synthesis matrix R is determined by adding, through the adders 57-1 to 57-5, the matrix $R_0$ and the matrix Q calculated as described above, and the noise estimation value $\rho^2 I$ determined at the noise estimation unit 40, and is entered to the matrix calculation unit 58.

The matrix calculation unit 58 thus determines the tap coefficient w by resolving the above-described Eq. (2.1) based on the synthesis matrix R and the channel estimation value for the serving cell (the despreading results from the serving cell code despreading units 11-1 and 12-1), and provides the tap coefficient w to each of the tap multipliers 22 in the FIR filtering unit 20 (weighting control step).

As described above, according to this embodiment, at the weighted addition control (calculation of the tap coefficient w) step at the equalizer (the FIR filtering unit 20), since the correlation matrix $R_0$ for the serving cell (correlation value) is determined based on channel estimation values for all signal timings and the correlation matrix Q for the non-serving cell (correlation value) is determined based solely on the channel estimation values at the identical signal timing, it is possible to improve the receiver performance, thereby reducing the effect of the interference wave from the non-serving cell while reducing the calculation amount.

For example, since an increase in the calculation amount in this example compared to Conventional Example 1 is proportional to the inverse of the square of the number of taps (the number of synthesis coefficients) per antenna, suppose that the number of the BTSs is 2 and the number of taps per antenna is 40, the technique of this example can be achieved with an about 1.3% increase in the calculation amount compared to Conventional Example 1. Note that Conventional Example 2 will require the calculation amount of twofold (a 100% increase).

(B) Description of First Variant

The correlation matrix Q for the non-serving cell is calculated based solely on the channel estimation values for the identical signal timing in the above-described embodiment. However, similar to the correlation matrix for the serving cell, the correlation matrix may be calculated based on channel estimation values at all signal timings for a non-serving cell to which signals having a power greater than a predetermined power threshold are incoming (such a non-serving cells is called as a "non-serving cell having a greater power," and other non-serving cells are called "non-serving cells having smaller powers").

Figure 7:
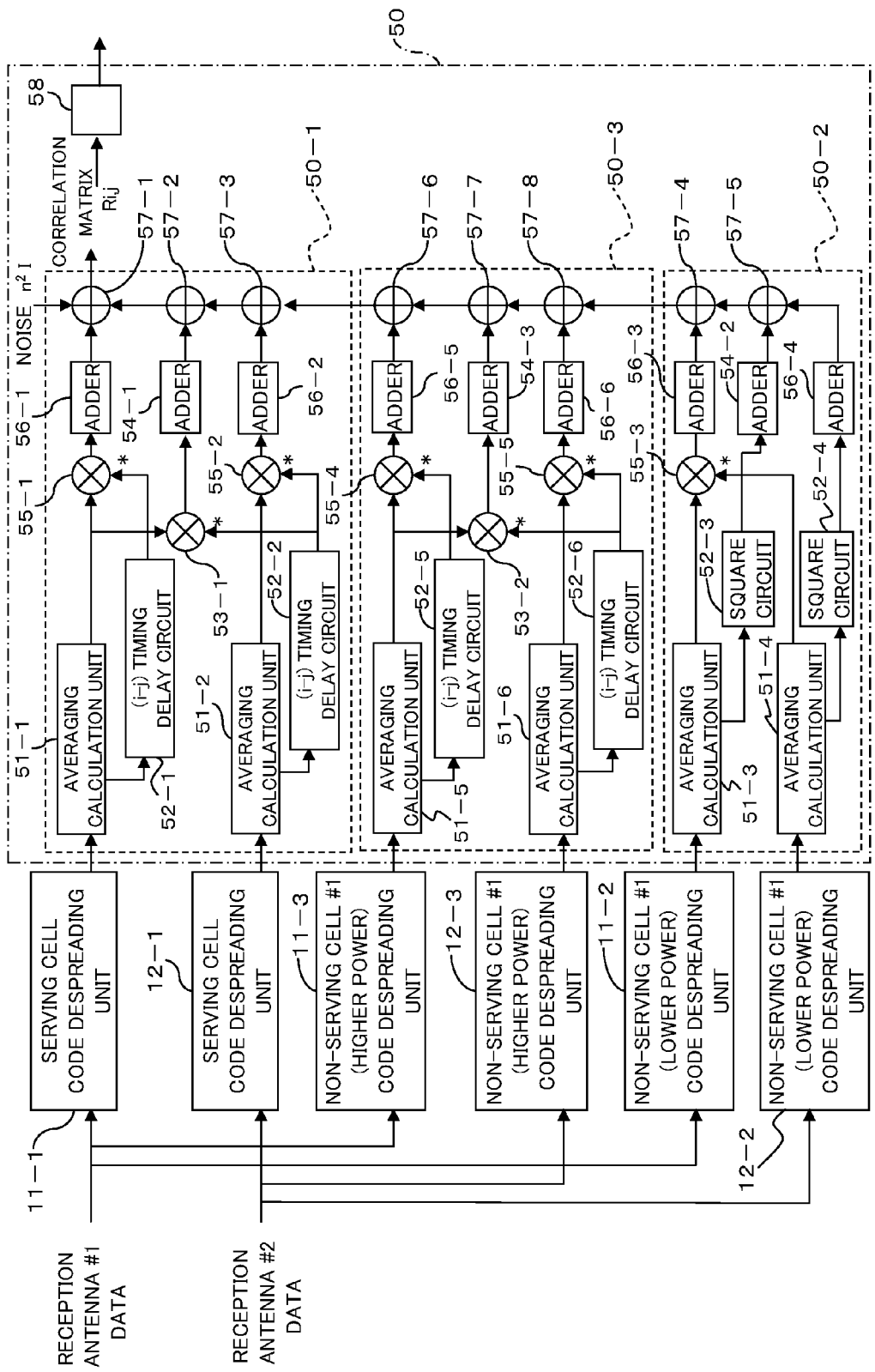
FIG. 7 is block diagram illustrating a first variation of the wireless receiver depicted in FIGS. 1-3.

For example, the configuration corresponding to FIG. 3 is illustrated in FIG. 7 in which signals are incoming from a non-serving cell #1 having a greater power and a non-serving cell #2 having a greater smaller, other than signals from the serving cell. The wireless reception apparatus depicted in FIG. 7 is different from the configuration illustrated in FIG. 3 in that it further includes a code despreading unit 11-3 that determines a channel estimation value by despreading a reception signal at the antenna #1 using the spreading code of the common pilot signal of the non-serving cell #1 and a non-serving cell code dispreading unit 12-3 that determine a channel estimation value by despreading a reception signal at the antenna #2 using the spreading code of the common pilot signal of the non-serving cell #1, and that a non-serving cell correlation matrix calculation block 50-3 that has the configuration similar to the serving cell correlation matrix calculation block 50-1 is added for the non-serving cell #1 having a greater power and a non-serving cell correlation matrix calculation block 50-2 that determines the correlation matrix Q corresponds to the non-serving cell #2 having a smaller power.

That is, the non-serving cell correlation matrix calculation block 50-3 is configured to include averaging calculation units 51-5 and 51-6, timing delay circuits 52-5 and 52-6, the complex multipliers 53-2, 55-4, and 55-5, and adders 54-3, 56-5, 56-6, and 57-6 to 57-8, similar to the components in the serving cell correlation matrix calculation block 50-1.

In addition, in this case, in the non-serving cell correlation matrix calculation block 50-2, the non-serving cell code dispreading unit 11-2 is adapted to determine the channel estimation value by despreading a reception signal at the antenna #1 using the spreading code of the common pilot signal of the non-serving cell #2. The non-serving cell code dispreading unit 12-2 is adapted to determine the channel estimation value by despreading reception signal at the antenna #2 using the spreading code of the common pilot signal of the non-serving cell #2.

In the wireless reception apparatus that is configured as described above, even being non-serving cells, for the non-serving cell #1 having a greater power which has a power estimation value obtained at the power estimation value unit 30 of a predetermined power threshold or greater, the correlation matrix is determined at the non-serving cell correlation matrix calculation block 50-3 based on channel estimation values at the identical and different signal timings similar to the above-described serving cell correlation matrix calculation block 50-1, and for the non-serving cell 2 having a smaller power, the correlation matrix Q is determined at the non-serving cell correlation matrix calculation block 50-2 based solely on channel estimation values without signal timing difference, similar to the above-described embodiment.

The tap coefficient w is determined according to the above Eq. (2.1) at the matrix calculation unit 58 based on the synthesis matrix R of the correlation matrixes determined at each of the correlation matrix calculation blocks 50-1, 50-2, and 50-3 for each of the serving cell and two non-serving cells #1 and #2.

As described above, according to this variant, even for non-serving cells, since a further accurate correlation value calculations are executed based on channel estimation values at the identical and different signal timings for non-serving cells that have greater reception powers and larger amounts of interferences, it is possible to further improve the receiver performance by eliminating interference components from non-serving cells having greater reception powers, as compared to the above-described embodiment.

(C) Description of Second Variant

Note that when there are three or more non-serving cells, a reception power measurement may be executed for each base station, and the correlation matrixes similar to the correlation matrix $R_0$ for the serving cell may be determined (that is, correlation value calculations are executed based on channel estimation values at the identical and different signal timings) for a predetermined number of base stations that are selected according to in the descending order of the power. The correlation matrixes Q may be determined for other non-serving cells based solely on the channel estimation values for the identical signal timing.

Figure 8:
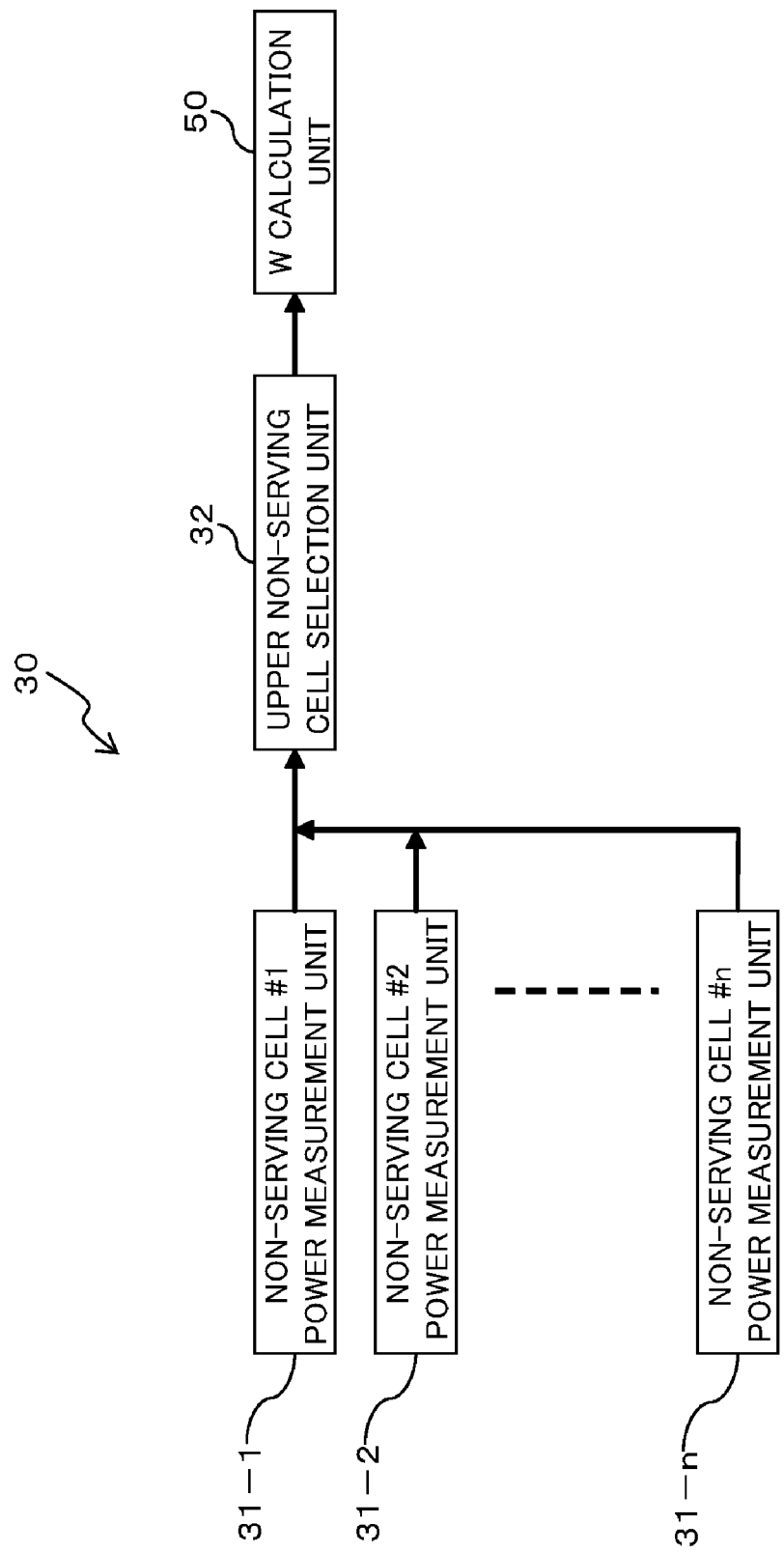
FIG. 8 is block diagram illustrating a second variation of the wireless receiver depicted in FIGS. 1-3.

In this case, for example, as depicted in FIG. 8, a power estimation unit (power measurement unit) 30 includes non-serving cell power measurement units 31-1 to 31-$n$ for each of non-serving cells #1 to #n, and an upper non-serving cell selection unit 32 that selects top m non-serving cells in the descending order of the measurement results by the non-serving cell power measurement units 31-1 to 31-$n$, and the number of block operations corresponding to the above-described serving cell correlation matrix calculation block 50-1 and the non-serving cell correlation matrix calculation block 50-2 may be controlled by according to the selection result.

By configuring as described above, even when there are three or more non-serving cells, it is possible to eliminate interference components from the non-serving cells having greater reception powers, thereby further improving the receiver performance. Note that the above-described number of base stations may be predetermined based on the circuit scale or characteristics or the like, or may be adaptively changed.

(D) Description of Third Variant

In addition, when there are three or more non-serving cells, a reception power measurement may be executed for each base station. For base stations having power equal to or greater than a predetermined power threshold, the correlation matrixes similar to the correlation matrix $R_0$ for the serving cell may be determined (that is, correlation value calculations are executed based on channel estimation values at the identical and different signal timings). For other non-serving cells, the correlation matrix Q may be determined based on the channel estimation values for the identical signal timing from the view point of the power consumption since the other non-serving cells do not greatly contribute to an improvement in the receiver performance.

Figure 9:
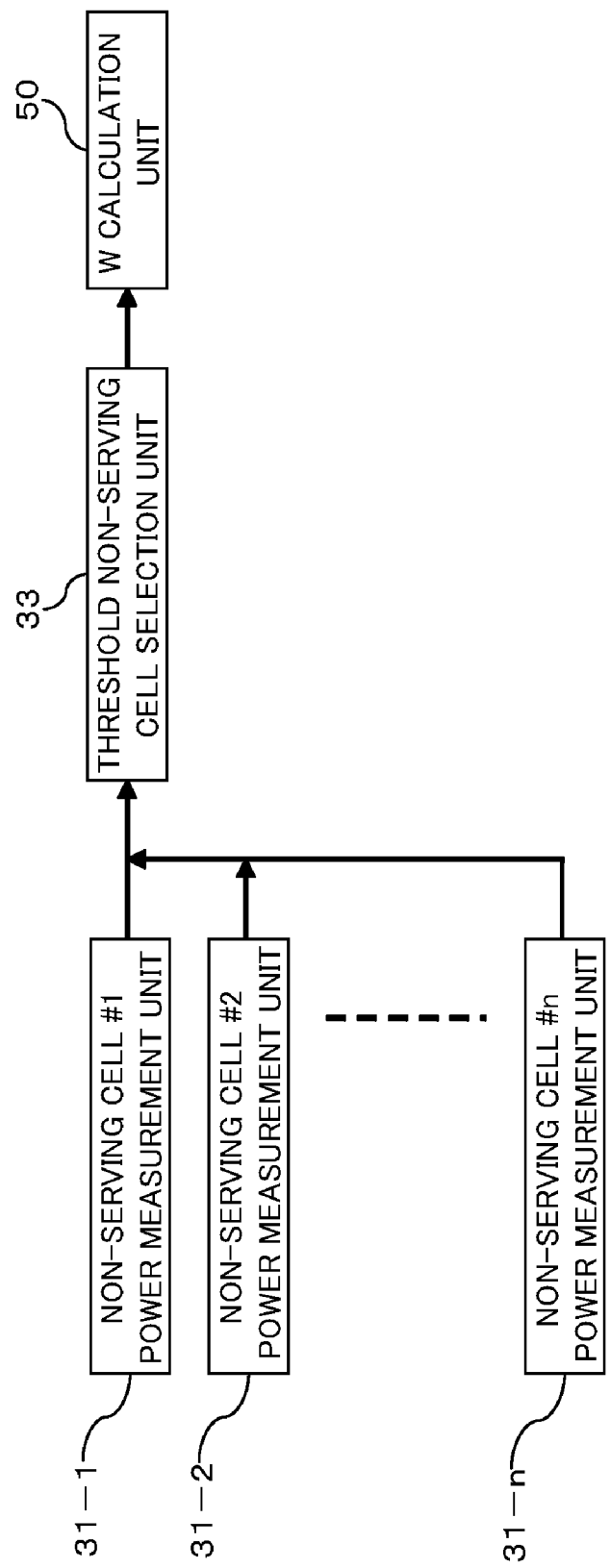
FIG. 9 is block diagram illustrating a third variation of the wireless receiver depicted in FIGS. 1-3.

In this case, for example, as depicted in FIG. 9, a power estimation unit (power measurement unit) 30 includes non-serving cell power measurement units 31-1 to 31-$n$ for each of non-serving cells #1 to #n, and a threshold non-serving cell selection unit 33 that selects non-serving cells having measurement results by the non-serving cell power measurement units 31-1 to 31-$n$ of greater than or equal to a predetermined power threshold, and the number of block operations corresponding to the above-described serving cell correlation matrix calculation block 50-1 and the non-serving cell correlation matrix calculation block 50-2 may be controlled by according to the selection result.

This provides the effects similar to those of the above second variant, and also further simplify and increase the speed of the non-serving cell selection operation. Note that the value of the predetermined power threshold may be predetermined on the receiver performance, the power consumption or the like, or may be adaptively changed.

(E) Description of Forth Variant

Although, generally, the power measurement of interference components is executed by subtracting the signal component from the power measurement of the reception signal (signal component+interference component), only the thermal noise may be considered as the interference amount in this case since the noise estimation (noise calculation unit) 40 can determine the powers (estimation values) for all base stations (the serving cell and non-serving cells).

The calculation of the thermal noise may be executed by the following Eq. (2.6) using the temperature T and the Boltzmann constant K.

$$\rho^2 = KT \quad (2.6)$$

In addition, considering the noise figure (NF) of the wireless reception apparatus, the thermal noise may also be determined as follows:

$$\rho^2 = KT + NF \quad (2.7)$$

Figure 10:
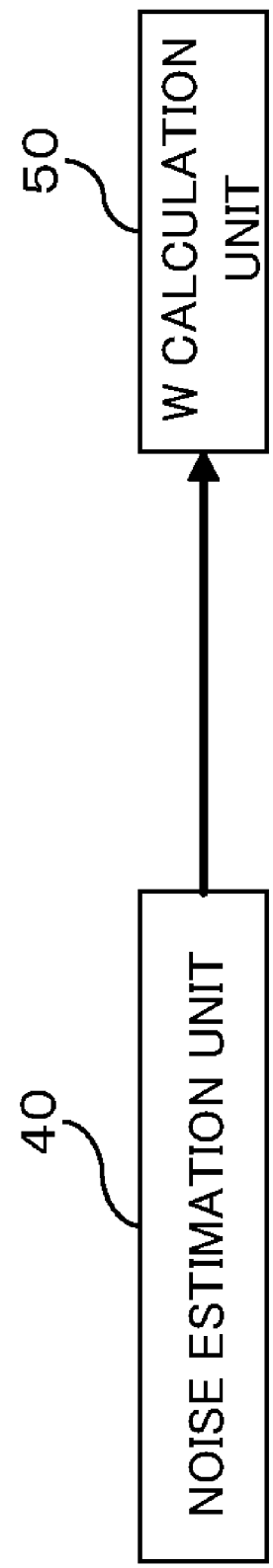
FIG. 10 is block diagram illustrating a fourth variation of the wireless receiver depicted in FIGS. 1-3.

Accordingly, as depicted in FIG. 10, the noise estimation unit 40 may determine the noise component $\rho^2 I$ from Eq. (2.6) or (2.7), and provide it to the adder 57-1 depicted in FIG. 3 or FIG. 7.

As described above in detail at the weighted addition control (calculation of the tap coefficient) step at the equalizer, since the correlation matrix $R_0$ for the serving cell (first correlation value) is determined based on channel estimation values for all signal timings and the correlation matrix Q for the non-serving cell (second correlation value) is determined based solely on the channel estimation values at the identical signal timing, it is possible to improve the receiver performance, thereby reducing the effect of the interference wave from the non-serving cell while reducing the calculation amount. Accordingly, the embodiments may be considered as quite useful in the technical field of wireless communication, especially, in the technical field in which reception signals are equalized by an equalizer. According to the present invention, it is possible to reduce the amount of correlation calculation required for controlling the weighted addition in an equalizer.

In addition, according to the present invention, it is possible to improve the receiver performance by reducing the effect of interferences by signals from non-serving cell.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments have been described in detail, it should be understood that the various changes, substitutions, and alterations could be made hereto without departing from the spirit and scope of the invention.

What is claimed is:

1. A control apparatus for an equalizer that equalizes a reception signal by controlling a weighting-adding on a received sequence based on a correlation between a signal sent from a first wireless base station and an interference signal from a second wireless base station to the signal, the control apparatus comprising:

a estimator that determines a first channel estimation value regarding the first wireless base station based on a first signal from the first wireless base station, determines a second channel estimation value regarding the first wireless base station based on a second signal received in the same timing as the first signal from the first wireless base station, determines a third channel estimation value regarding the second wireless base station based on a third signal from the second wireless base station, and determines a fourth channel estimation value regarding the second wireless base station based on a fourth signal received in the same timing as the third signal from the second wireless base station;

a calculator that determines, for the first wireless base station, a first correlation value based on a calculation result on the first and second channel estimation values and a calculation result on other channel estimation values having different signal timings, and determines, for the second wireless base station, a second correlation value based on a calculation result on the third and fourth channel estimation values; and a controller that controls the weighting-adding at the equalizer based on the first and second correlation values determined by the calculator.

2. The control apparatus for an equalizer according to claim 1, wherein the estimator comprises:

a first estimator that determines the first and second channel estimation values and the other channel estimation values regarding the first wireless base station based on pilot signals sent from the first wireless base station; and a second estimator that determines the third and fourth channel estimation values regarding the second wireless base station based on pilot signals sent from the second wireless base station, and the calculator comprises:

a first calculator that determines the first correlation value regarding the first wireless base station from a product of the first and second channel estimation values and the other channel estimation values determined by the first estimator; and a second calculator that determine the second correlation value regarding the second wireless base station from a product of the third and fourth channel estimation values.

3. The control apparatus for an equalizer according to claim 1, further comprising:

a monitor that monitors each reception power of signals of a plurality of the second wireless base stations, wherein the calculator is configured to determine, for the second wireless base station that has the reception power equal to or greater than a predetermined power threshold, a correlation value based on a calculation result on channel estimation values having an identical signal timing and a calculation result on channel estimation values having different signal timings as the second correlation value, and determine, for the remaining second wireless base station, a correlation value based on a calculation result on channel estimation values having an identical signal timing as the second correlation value.

4. The control apparatus for an equalizer according to claim 1, further comprising:

a monitor that monitors each reception power of signals of a plurality of the second wireless base stations, wherein the calculator is configured to determine, for a predetermined number of second wireless base stations selected by the descending order of the reception power from the highest, a correlation value based on a calculation result on channel estimation values having an identical signal timing and a calculation result on channel estimation values having different signal timings as the second correlation value, and determine, for the remaining second wireless base station, a correlation value based on a calculation result on channel estimation values having an identical signal timing as the second correlation value.

5. The control apparatus for an equalizer according to claim 1, further comprising:

a noise detector that determines a thermal noise based on a temperature, wherein the controller is configured to control the weighting-adding based on each correlation value and the thermal noise determined by the noise detector.

6. A wireless terminal comprising the control apparatus for an equalizer according to claim 1.

7. A control method of an equalizer that equalizes a reception signal by controlling a weighting-adding on a received sequence based on a correlation between a signal sent from a first wireless base station and an interference signal from a second wireless base station to the signal, the control method comprising:

calculating a first channel estimation value regarding the first wireless base station based on a first signal from the first wireless base station, calculating a second channel estimation value regarding the first wireless base station based on a second signal received in the same timing as the first signal from the first wireless base station, calculating a third channel estimation value regarding the second wireless base station based on a third signal from the second wireless base station, and calculating a fourth channel estimation value regarding the second wireless base station based on a fourth signal received in the same timing as the third signal from the second wireless base station;

determining, for the first wireless base station, a first correlation value based on a calculation result on the first and second channel estimation values and a calculation result on other channel estimation values having different signal timings, and determining, for the second wireless base station, a second correlation value based on a calculation result on the third and fourth channel estimation values; and controlling the weighting-adding at the equalizer based on the determined first and second correlation values.

8. The control method of an equalizer according to claim 7, wherein the calculating comprises:

calculating the first and second channel estimation values and the other channel estimation values regarding the first wireless base station based on pilot signals sent from the first wireless base station and calculating the third and fourth channel estimation values regarding the second wireless base station based on pilot signals sent from the second wireless base station, and the determining comprises:

determining the first correlation value regarding the first wireless base station from a product of the first and second channel estimation values and the other channel estimation values regarding the first wireless base station and determining the second correlation value regarding the second wireless base station from a product of the third and fourth channel estimation values.

9. The control method of an equalizer according to claim 7, further comprising:

monitoring each reception power of signals of a plurality of the second wireless base stations, wherein the determining comprises: determining, for the second wireless base station that has the reception power equal to or greater than a predetermined power threshold, a correlation value based on a calculation result on channel estimation values having an identical signal timing and a calculation result on channel estimation values having different signal timings as the second correlation value, and determining, for the remaining second wireless base station, a correlation value based on a calculation result on channel estimation values having an identical signal timing as the second correlation value.

10. The control method of an equalizer according to claim 7, further comprising:

monitoring each reception power of signals of a plurality of the second wireless base stations, wherein the determining comprises: determining, for a predetermined number of second wireless base stations selected by the descending order of the reception power from the highest, a correlation value based on a calculation result on channel estimation values having an identical signal timing and a calculation result on channel estimation values having different signal timings as the second correlation value, and determining, for the remaining second wireless base station, a correlation value based on a calculation result on channel estimation values having an identical signal timing as the second correlation value.

11. The control method of an equalizer according to claim 7, further comprising:

detecting a thermal noise based on a temperature, wherein the controlling comprises: controlling the weighting-adding based on each correlation value and the detected thermal noise.

* * * * *